US008860843B2

United States Patent
Mate et al.

(10) Patent No.: US 8,860,843 B2
(45) Date of Patent: Oct. 14, 2014

(54) METHOD AND APPARATUS FOR CAPTURING AN IMAGE OF AN ILLUMINATED AREA OF INTEREST

(75) Inventors: Sujeet Shyamsundar Mate, Tampere (FI); Dmytro Rusanovskyy, Lempäälä (FI)

(73) Assignee: Nokia Corporation, Espoo (FI)

( * ) Notice: Subject to any disclaimer, the term of this patent is extended or adjusted under 35 U.S.C. 154(b) by 624 days.

(21) Appl. No.: 13/046,097

(22) Filed: Mar. 11, 2011

(65) Prior Publication Data

US 2012/0229699 A1 Sep. 13, 2012

(51) Int. Cl.
| | |
|---|---|
| H04N 9/73 | (2006.01) |
| H04N 5/225 | (2006.01) |
| H05B 37/02 | (2006.01) |
| H04N 5/235 | (2006.01) |
| H04N 5/243 | (2006.01) |
| H04N 5/232 | (2006.01) |
| H04N 5/222 | (2006.01) |

(52) U.S. Cl.
CPC ........... *H04N 5/2256* (2013.01); *H05B 37/029* (2013.01); *H04N 5/2353* (2013.01); *H04N 5/243* (2013.01); *H04N 5/23212* (2013.01)
USPC ................. 348/224.1; 348/370; 348/E05.022

(58) Field of Classification Search
USPC .......................... 348/224.1, 370, 371, E05.022
See application file for complete search history.

(56) References Cited

U.S. PATENT DOCUMENTS

| | | | |
|---|---|---|---|
| 3,942,076 A | 3/1976 | Ellin | |
| 4,816,855 A | 3/1989 | Kitaura et al. | |
| 7,035,534 B2 * | 4/2006 | Shih et al. | 396/57 |
| 7,775,575 B2 * | 8/2010 | Clark | 296/56 |
| 8,326,141 B1 * | 12/2012 | Clark | 396/198 |
| 2005/0281549 A1 | 12/2005 | Shih et al. | |
| 2008/0005353 A1 * | 1/2008 | Panabaker et al. | 709/238 |
| 2009/0303342 A1 * | 12/2009 | Corcoran et al. | 348/222.1 |
| 2010/0202767 A1 | 8/2010 | Shirakawa | |
| 2011/0119409 A1 * | 5/2011 | King | 710/14 |
| 2012/0045193 A1 * | 2/2012 | King | 396/56 |
| 2012/0051726 A1 * | 3/2012 | King | 396/4 |

FOREIGN PATENT DOCUMENTS

JP 2004-297414 A 10/2004

OTHER PUBLICATIONS

Alenius, S. et al., *Combination of Multiple Images for Flash Re-Lightning*, IEEE, (2008), 6 pages.
Chen, X. et al., *IR and Visible Light Face Recognition*, Computer Vision and Image Understanding, 99, (2005), pp. 332-358.
Khan, I. R. et al., *HDR Image Tone Mapping Using Histogram Adjustment Adapted to Human Visual System*, IEEE, ICICS, (2009), 5 pages.

(Continued)

*Primary Examiner* — Hung Lam
(74) *Attorney, Agent, or Firm* — Alston & Bird LLP

(57) ABSTRACT

A method, apparatus and computer program product are provided for facilitating the capture of an image of an illuminated area of interest. A method, apparatus and computer program product may tailor the operation of the illumination source based upon the illumination conditions of one or more regions within the area of interest. Additionally, the method, apparatus and computer program product may coordinate the operation of the illumination sources and one or more image sensors to facilitate improved image capture.

16 Claims, 7 Drawing Sheets

(56) References Cited

OTHER PUBLICATIONS

Waxman, A. M. et al., *Color Night Vision: Opponent Processing in the Fusion of Visible and IR Imagery*, Neural Network, vol. 10, No. 1, (1997), pp. 1-6.

Canon Patents Radio-Controlled Flash | Gadget Lab | Wired.com [online] [retrieved Mar. 11, 2011]. Retrieved from the Internet: <URL: http://www.wired.com/gadgetlab/2010/08/canon-patents-radio-controlled-flash>. 4 pages.

International Search Report and Written Opinion from International Application No. PCT/FI2012/050091, mailed Jul. 3, 2012.

* cited by examiner

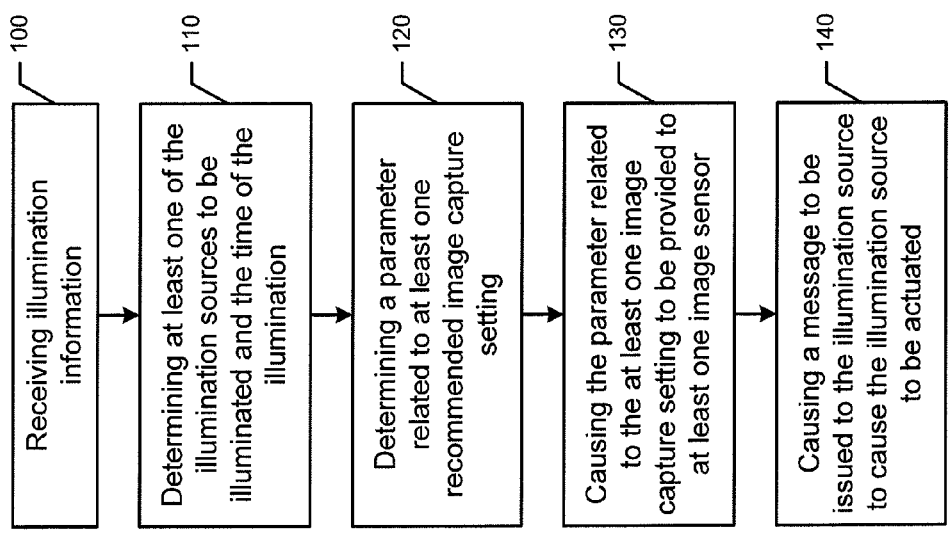

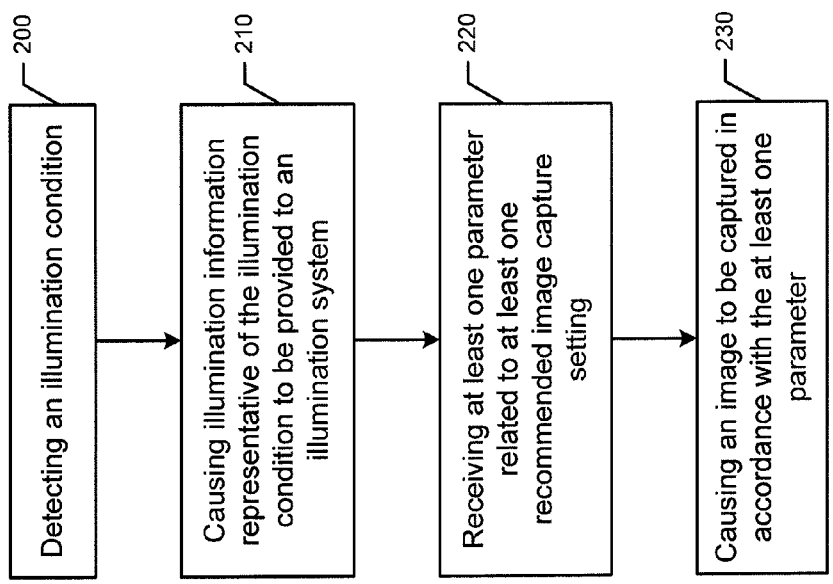

METHOD AND APPARATUS FOR CAPTURING AN IMAGE OF AN ILLUMINATED AREA OF INTEREST

TECHNOLOGICAL FIELD

Example embodiments of the present invention relate generally to the capture of images and, more particularly, relate to a method and apparatus for facilitating the capture of an image of an illuminated area of interest.

BACKGROUND

Various illumination techniques have been utilized in order to facilitate image capture, such as image capture in relatively low light conditions. For example, a flash that provides a pulse of visible light may be employed in order to illuminate a scene that is to be photographed. In instances in which the flash is integrated with the camera, the operational range of the flash, that is, the area or distance that is illuminated by the flash, may be restricted due to limitations in the illumination power and limitations in the capacity of the camera batteries that provide power for the flash. Additionally, a flash that draws power from the camera batteries may consume an undesirably large amount of power so as to limit the battery life.

A remote flash that is spaced apart from the camera and is powered by an external power supply may be utilized in order to at least partially overcome the limitations in illumination power and the challenges of power consumption. A remote flash may be triggered by the camera flash to illuminate a scene, thereby allowing for the illumination of a larger area or distance. Like a flash that is integrated with a camera, an external flash may have poor localization in that the flash illuminates everything in its vicinity. Also like a flash that is integrated with a camera, a remote flash generally operates in the visible spectrum of light and may therefore disturb or distort the visual scene for other observers. For example, in artistic or entertainment venues, such as a theater, a live music venue, or a video, television or film production, a visual scene may be the result of artistic vision that is utilized to bring the desired emotional message to the audience. However, a flash may disturb the visual scene and impair the artistic message that is intended to be conveyed by the scene.

In order to illuminate a scene without exposing the scene to levels of visible light that are distracting, techniques have been developed in which a scene is illuminated by a flash of infra-red (IR) light, either individually or in combination with visible light. By utilizing IR light, such as in combination with visible light, the colors of the resulting image remain true and correspond to the colors under ambient lighting conditions at the scene. One technique for obtaining an image of a scene that is illuminated with IR light and visible light is to capture a single image while the scene is concurrently exposed to both visible light and IR light. Alternatively, two images may be captured of the same scene with one image being captured while the scene is exposed to IR light and the other image being captured while the scene is exposed to visible light. In this technique, these two images of the same scene may then be combined. Various techniques may then be employed to combine the two images of the same scene captured while exposed in IR light and visible light.

Since illumination with IR light is invisible to the human eye, the IR illumination does not generally disturb or distort a scene or otherwise alter the message or mood to be conveyed by the scene. However, an IR flash that is integrated with a camera may have a limited operational range and poor localization and may also consume substantial power so as to limit the battery life of a hand held device, such as a camera, in a comparable fashion to a camera employing a visible light flash. As with a flash of visible light, an IR flash may be remote from the camera and, as such, may no longer draw power from the camera batteries and may have an improved operational range.

Although IR light is invisible to the human eye, illumination systems that combine illumination in both the visible and IR spectrums may still create images that deviate, to some degree, from realistic perception. In this regard, most lighting control systems presume the light is targeted towards the human visual system and operates in the spectrum that is visible to humans. As such, an image captured utilizing an illumination system that includes an IR component may appear different from the scene that the event's audience actually sees.

This situation may be considered undesirable, if realistic scene perception was supposed to be preserved in the digital image. Alternatively, this situation may be considered to be an artistic expression or a special effect addressed toward the digital image, if the lighting system can provide a controllable result to the digital image.

BRIEF SUMMARY

A method, apparatus and computer program product are herein provided for facilitating the capture of an image of an illuminated area of interest. A method, apparatus and computer program product of one embodiment may tailor the operation of the illumination source based upon the illumination conditions of one or more regions within the area of interest. Additionally, the method, apparatus and computer program product of an example embodiment may coordinate the operation of the illumination sources and one or more image sensors to facilitate improved image capture.

In one example embodiment, a method is provided that includes receiving illumination information from at least one of an illumination sensor or a lighting control system. In an instance in which the illumination information is received from the illumination sensor, the illumination information is representative of an illumination condition in at least one region of an area of interest. The method of this example embodiment also determines at least one of a plurality of illumination sources to be illuminated based upon the illumination information and also determines a time at which the at least one illumination source will be illuminated. The method of this embodiment may also determine a parameter related to at least one recommended image capture setting for at least one image sensor based upon at least one of the illumination information or illumination to be provided by the at least one illumination source. The method of this example embodiment may also cause the parameter related to be at least one recommended image capture setting to be provided to the at least one image sensor and may cause a message to be issued to the at least one illumination source to cause the at least one illumination source to be actuated at the time that has been determined.

The plurality of illumination sources may include at least one infra-red lamp and/or at least one visible-light lamp. In this embodiment, the determination of the one or more illumination sources to be illuminated may include determining whether a combination of infra-red and visible-light lamps is to be illuminated based upon the illumination information.

The method of one embodiment may determine the parameter related to at least one recommended image capture setting by determining a time, duration and the intensity of the illumination to be provided by the at least one illumination source. In this embodiment, the method may cause the information regarding the time at which and a duration during which the at least one illumination source will be illuminated to be provided to the at least one image sensor. The method of another embodiment may determine the parameter related to at least one recommended image capture setting by determining exposure time, analog gain or focal length. In this embodiment, the method may cause information regarding the exposure time, analog gain or focal length to be provided to the at least one image sensor. The method of one embodiment may cause a message to be issued to the at least one illumination source by causing a message to be issued to an interface switch that is in communication with a plurality of illumination sources.

In another example embodiment, an apparatus is provided that includes at least one processor and at least one memory including computer program code. The at least one memory and the computer program code are configured to, with the at least one processor, cause the apparatus at least to receive illumination information from at least one of the illumination sensor or lighting control systems. The illumination information received from the illumination sensor is representative of an illumination condition in at least one region of the area of interest. The apparatus of this embodiment may also be configured to determine at least one of a plurality of illumination sources to be illuminated based upon the illumination information and to determine the time at which the least one illumination source will be illuminated. The apparatus of this embodiment is also configured to determine a parameter related to at least one recommended image capture setting for at least one image sensor based upon at least one of the illumination information or illumination to be provided by at least one illumination source. The apparatus of this embodiment is also configured to cause the parameter related to the at least one recommended image capture setting to be provided to the at least one image sensor and to cause a message to be issued to the at least one illumination sensor to cause the at least one illumination source to be actuated at the time that has been determined.

The plurality of illumination sources may include at least one infra-red lamp and/or at least one visible-light lamp. In this embodiment, the apparatus may be configured to determine the one or more illumination sources to be illuminated by determining whether a combination of infra-red and visible-light lamps is to be illuminated based upon the illumination information.

The apparatus of one embodiment may be configured to determine the parameter related to at least one recommended image capture setting by determining a time, duration and the intensity of the illumination to be provided by the at least one illumination source. In this embodiment, the apparatus may be configured to cause the information regarding the time at which and a duration during which the at least one illumination source will be illuminated to be provided to the at least one image sensor. The apparatus of another embodiment may be configured to determine the parameter related to at least one recommended image capture setting by determining exposure time, analog gain or focal length. In this embodiment, the apparatus may be configured to cause information regarding the exposure time, analog gain or focal length to be provided to the at least one image sensor. The apparatus of one embodiment may be configured to cause a message to be issued to the at least one illumination source by causing a message to be issued to an interface switch that is in communication with a plurality of illumination sources. The apparatus of one embodiment may comprise or be embodied in a server.

In another example embodiment, a computer program product is provided that includes at least one computer-readable storage medium bearing computer program code embodied therein for use with a computer. The computer program code includes code for receiving illumination information from at least one of an illumination sensor or a lighting control system. In an instance in which the illumination information is received from the illumination sensor, the illumination information is representative of an illumination condition in at least one region of an area of interest. The computer program code of this example embodiment also includes code for determining at least one of a plurality of illumination sources to be illuminated based upon the illumination information and also for determining a time at which the at least one illumination source will be illuminated. The computer program code of this embodiment may also include code for determining a parameter related to at least one recommended image capture setting for at least one image sensor based upon at least one of the illumination information or illumination to be provided by the at least one illumination source. The computer program code of this example embodiment may also include code for causing the parameter related to be at least one recommended image capture setting to be provided to the at least one image sensor and for causing a message to be issued to the at least one illumination source to cause the at least one illumination source to be actuated at the time that has been determined.

In yet another example embodiment, an apparatus is provided that includes means for receiving illumination information from at least one of an illumination sensor or a lighting control system. In an instance in which the illumination information is received from the illumination sensor, the illumination information is representative of an illumination condition in at least one region of an area of interest. The apparatus of this example embodiment also includes means for determining at least one of a plurality of illumination sources to be illuminated based upon the illumination information and also for determining a time at which the at least one illumination source will be illuminated. The apparatus of this embodiment may also include means for determining a parameter related to at least one recommended image capture setting for at least one image sensor based upon at least one of the illumination information or illumination to be provided by the at least one illumination source. The apparatus of this example embodiment may also include means for causing the parameter related to be at least one recommended image capture setting to be provided to the at least one image sensor and means for causing a message to be issued to the at least one illumination source to cause the at least one illumination source to be actuated at the time that has been determined.

In a further example embodiment, an apparatus is provided that includes at least one processor and at least one memory including computer program code. The at least one memory and the computer program code are configured to, with the at least one processor, cause the apparatus at least to cause illumination information representative of an illumination condition proximate to the apparatus to be provided to an illumination system. The apparatus of this embodiment is also configured to receive at least one parameter related to at least one recommended image capture setting and to cause an image to be captured in accordance with the at least one parameter.

In one embodiment, the apparatus is further configured to detect the illumination condition prior to causing illumination information to be provided to the illumination system. The apparatus may be configured to receive at least one parameter by receiving a time, duration and intensity of the illumination to be provided by the illumination system. Additionally or alternatively, the apparatus may be configured to receive at least one parameter by receiving the exposure time, analog gain or focal length. The apparatus may comprise or be embodied on a mobile phone. In this embodiment, the mobile phone may include user interface circuitry configured to facilitate user control of at least come functions of the mobile phone through use of a user interface.

In another example embodiment, a method is provided that includes causing illumination information representative of an illumination condition proximate thereto to be provided to an illumination system. The method of this embodiment also receives at least one parameter related to at least one recommended image capture setting and causes an image to be captured in accordance with the at least one parameter.

In a further example embodiment, a computer program product is provided that includes at least one computer-readable storage medium bearing computer program code embodied therein for use with a computer. The computer program code includes code for causing illumination information representative of an illumination condition proximate thereto to be provided to an illumination system. The computer program code of this embodiment also includes code for receiving at least one parameter related to at least one recommended image capture setting and causing an image to be captured in accordance with the at least one parameter.

In yet another example embodiment, an apparatus is provided that includes means for causing illumination information representative of an illumination condition proximate thereto to be provided to an illumination system. The apparatus of this embodiment also includes means for receiving at least one parameter related to at least one recommended image capture setting and causing an image to be captured in accordance with the at least one parameter.

In one embodiment, an apparatus is provided that includes at least one processor and at least one memory including computer program code with the at least one memory and the computer program code being configured to, with the at least one processor, cause the apparatus at least to read illumination information from a file and determine a correspondence between the illumination and an internal clock. The apparatus of this embodiment may also retrieve from the file a time-related illumination condition proximate to the apparatus to be provided to an illumination system and retrieve from the file at least one time-related parameter related to at least one recommended image capture setting. The apparatus of this embodiment may also cause an image to be captured in accordance with the at least one parameter.

In another embodiment, an apparatus is provided that includes at least one processor and at least one memory including computer program code with the at least one memory and the computer program code being configured to, with the at least one processor, cause the apparatus at least to receive illumination information from a radio interface, receive from the radio interface a time-related illumination condition proximate to the apparatus to be provided to an illumination system and receive from the radio interface at least one time-related parameter related to at least one recommended image capture setting. The apparatus of this embodiment may also be configured to cause an image to be captured in accordance with the at least one parameter.

BRIEF DESCRIPTION OF THE DRAWINGS

Figure 1:
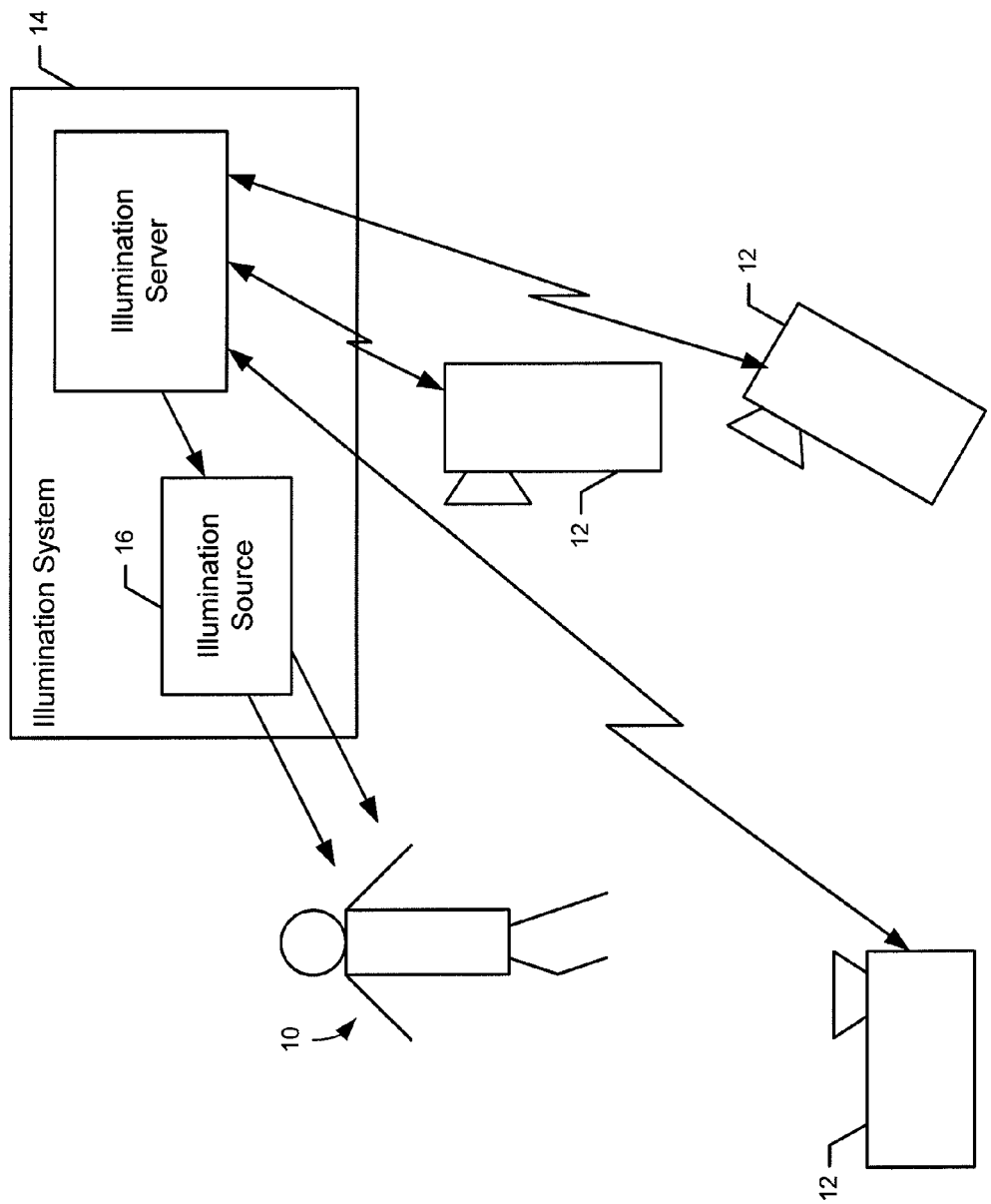
Figure 2:
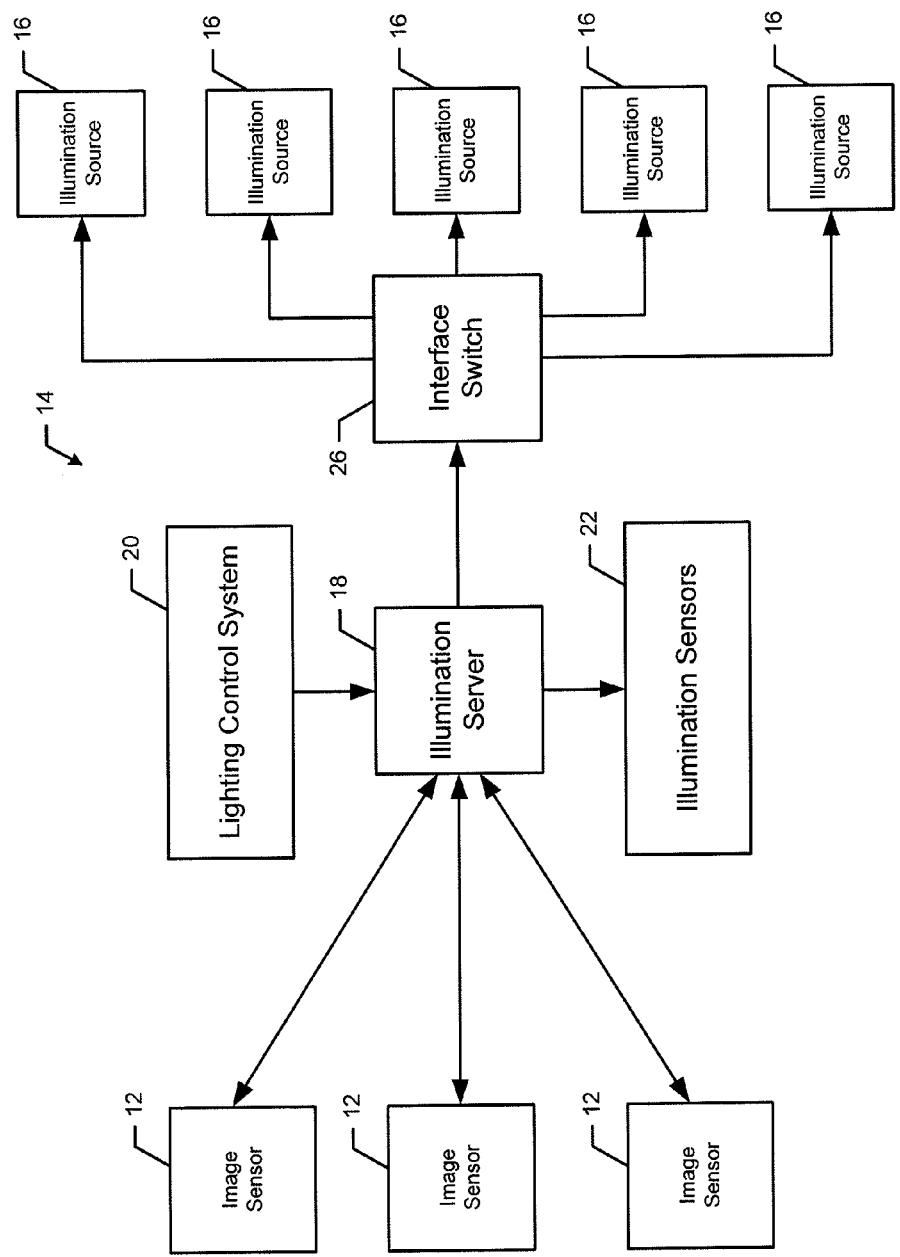
Figure 3:
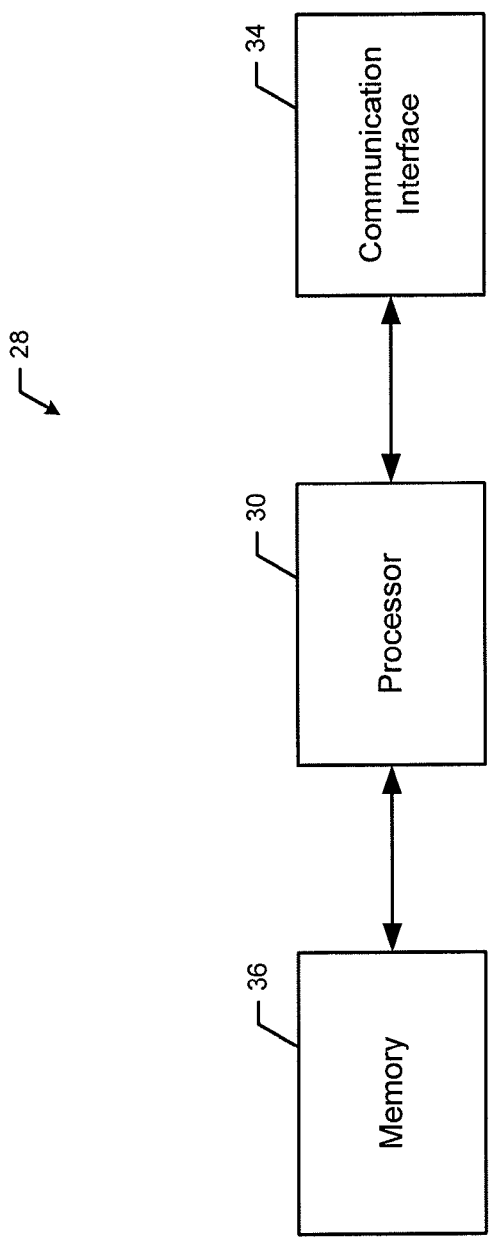
Figure 4:
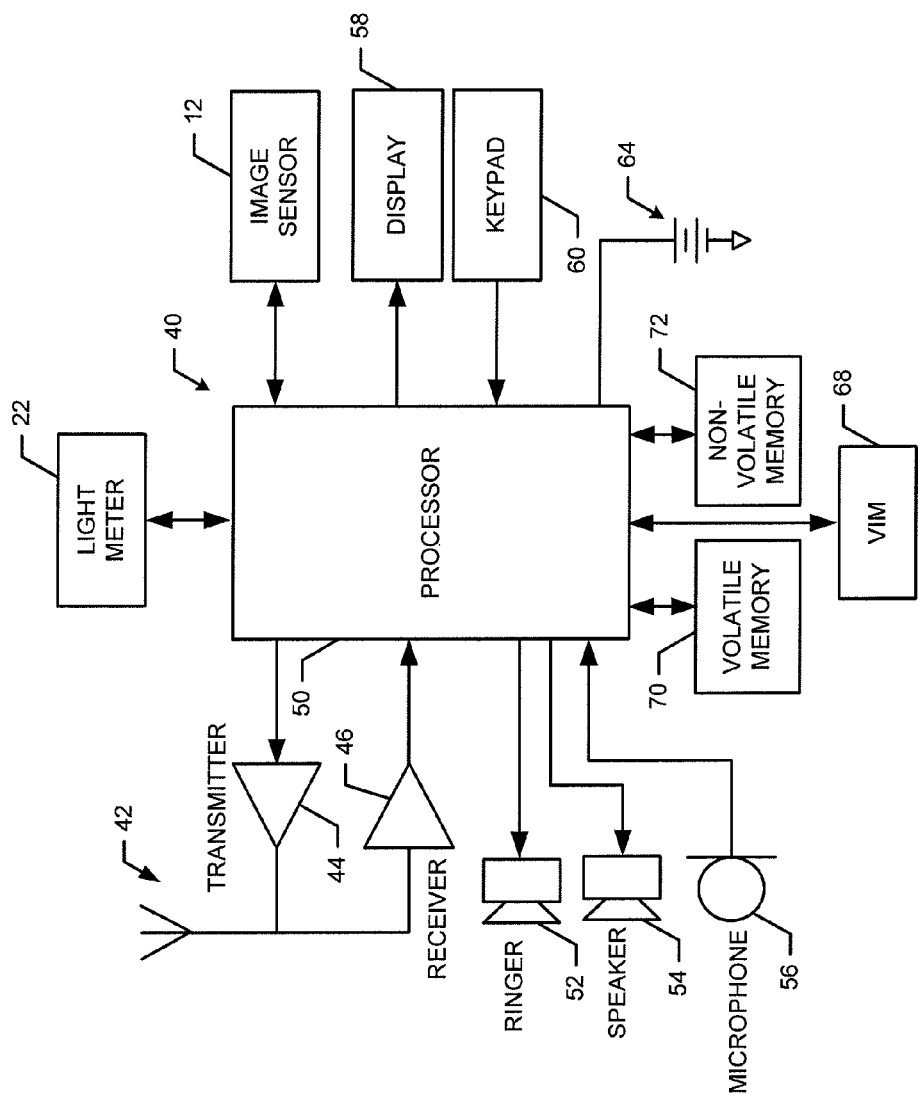
Figure 5:
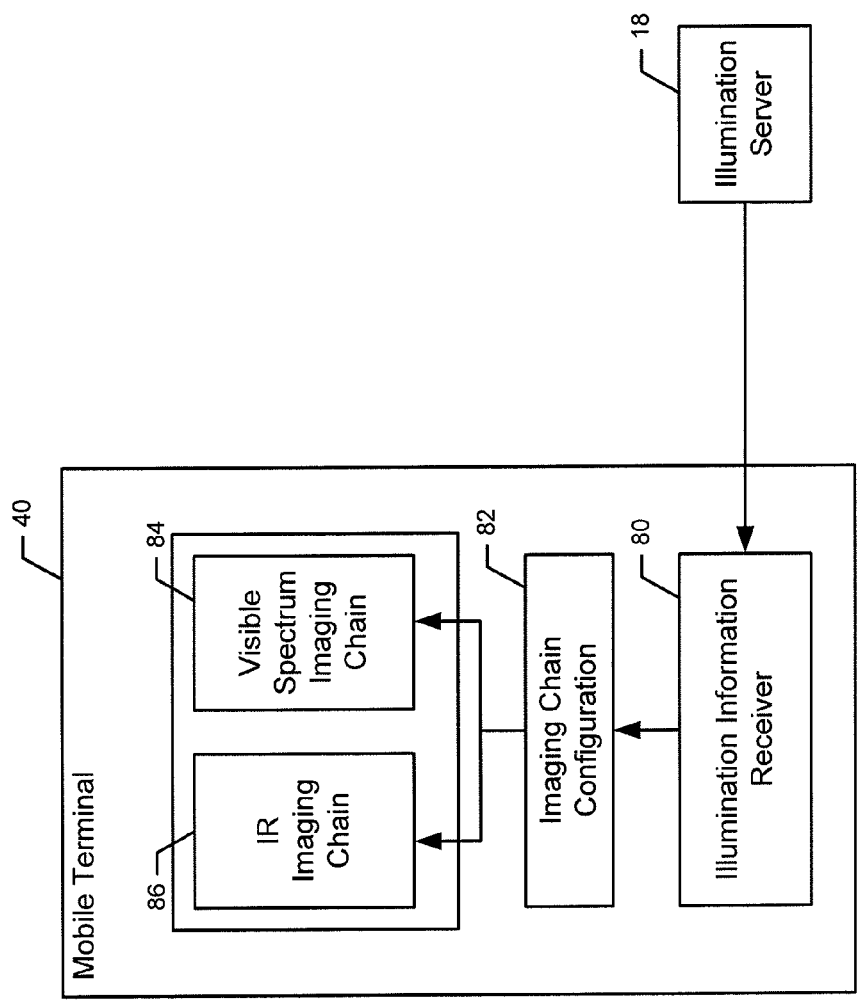

Having thus described embodiments of the invention in general terms, reference will now be made to the accompanying drawings, which are not necessarily drawn to scale, and wherein:

FIG. 1 is a schematic representation of a system according to an example embodiment of the present invention;

FIG. 2 is a block diagram of the system of FIG. 1 according to an example embodiment of the present invention;

FIG. 3 is a block diagram of an apparatus that may comprise or be embodied in an illumination server or a mobile terminal according to an example embodiment of the present invention;

FIG. 4 is a block diagram of a mobile terminal according to an example embodiment of the present invention;

FIG. 5 is a block diagram illustrating the provision of illumination information signaling from the illumination server to a mobile terminal according to an example embodiment of the present invention.

FIG. 6 is a flow chart illustrating operations performed by an apparatus that may be embodied by an illumination server in accordance with one example embodiment of the present invention; and FIG. 7 is a flow chart illustrating operations performed by an apparatus that may be embodied by a mobile terminal in accordance with one example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

As shown in FIG. 1, a system in accordance with an example embodiment to the present invention may illuminate an area 10 of interest and may capture an image of the illuminated area of interest. In the illustrated embodiment, the area of interest is represented by the schematic representation of a person. However, the area of interest may be any of a wide variety of scenes, including scenes from plays, musicals or other performances, sporting events or other gatherings, to name just a few. The system includes one or more image sensors 12, such as mobile terminals having an image capturing device, such as a camera. In addition to capturing an image of the area of interest, the image sensors may also be configured to capture illumination information and to provide an illumination system 14 with the illumination information. Based upon the illumination information, the illumination system may actuate one or more illumination sources 16. These illumination sources illuminate the area of interest such that the image sensors can capture representative images of the area of interest while illuminated. As described below, the illumination system may also communicate with the image sensors so as to provide the image sensors with information that facilitates the capture of quality images by the image sensors.

The system of FIG. 1 is shown in block diagram form in FIG. 2. In the illustrated embodiment, the illumination system 14 includes an illumination server 18 for communicating with various other devices and subsystems and for controlling and managing the operation of the system including illumination of the area 10 of interest and, to some degree, the capture of the images. Although described herein as an illumination server, the illumination server need not necessarily be a server, but may be embodied as any of various computing devices that may be configured to perform the functionality described herein in conjunction with the illumination server.

In this regard, FIG. 3 is a block diagram view of one example of an apparatus 28 according to an example embodiment of the present invention that may be embodied as or otherwise employed, for example, on or as an element of an illumination server 18. The apparatus may include or otherwise be in communication with a processor 30, a communication interface 34 and a memory device 36. The memory device may include, for example, one or more volatile and/or non-volatile memories. In other words, for example, the memory device may be an electronic storage device (e.g., a non-transitory computer readable storage medium) comprising gates configured to store data (e.g., bits) that may be retrievable by the processor. The memory device may be configured to store information, data, applications, instructions or the like for enabling the apparatus to carry out various functions in accordance with example embodiments of the present invention. For example, the memory device could be configured to buffer input data for processing by the processor. Additionally or alternatively, the memory device could be configured to store instructions for execution by the processor.

The apparatus 28 may, in some embodiments, be the illumination server 18 (or a component device thereof. However, in some embodiments, the apparatus of FIG. 3 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size and/or limitation of electrical interaction for component circuitry included thereon. The apparatus may therefore, in some cases, be configured to implement an embodiment of the present invention on a single chip or as a single "system on a chip". As such, in some cases, a chip or chipset may constitute means for performing one or more operations for providing the functionalities described herein.

The processor 30 may be embodied in a number of different ways. For example, the processor may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, processing circuitry, or the like. As such, in some embodiments, the processor may include one or more processing cores configured to perform independently. A multi-core processor may enable multiprocessing within a single physical package. Additionally or alternatively, the processor may include one or more processors configured in tandem via a bus to enable independent execution of instructions, pipelining and/or multithreading.

In an example embodiment, the processor 30 may be configured to execute instructions stored in the memory device 36 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., the illumination server 18) adapted for employing embodiments of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 34 may be any means such as a device or circuitry embodied in either hardware, software, or a combination of hardware and software that is configured to receive and/or transmit data from/to a network and/or any other device or module in communication with the apparatus 28. In this regard, the communication interface may include, for example, an antenna (or multiple antennas) and supporting hardware and/or software for enabling communications with a wireless communication network. In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Referring again to FIG. 2, the illumination server 18 may receive input from a variety of devices or subsystems. For example, the system may include a lighting control system 20 that provides instructions regarding the manner in which the illumination sources 16 are to be illuminated, typically in terms of the intensity of the illumination, the timing of the illumination and the duration of the illumination. While lighting control systems may be deployed in a variety of applications, more sophisticated or professional programs or events, such as plays, musical performances or the like, may include a lighting control system that is configured to control the illumination of a stage or other venue and coordinate the illumination with the performance. In instances in which the lighting control system provides instructions that direct, among other things, the timing of the illumination, the illumination server and the lighting control system may be synchronized prior to commencing illumination.

In addition to or instead of, a lighting control system 20, the illumination server 18 of an example embodiment may receive illumination information from one or more illumination sensors 22. While the system may include any number of illumination sensors, the system of one embodiment includes a plurality of illumination sensors that may be positioned at different locations about the area 10 of interest. Each illumination sensor may be configured to gather data representative of the ambient lighting conditions in proximity to the illumination sensor. While illumination sensors may be embodied in a variety of different manners, the illumination sensor of an example embodiment may be a light meter that is used to measure the amount of light proximate to the light meter. The illumination sensors in this embodiment may therefore determine the light conditions proximate the respective sensors and provide illumination information describing those light conditions to the illumination server. In one embodiment, the illumination server may transmit signals to the illumination sensors requesting that the illumination sensors detect the illumination conditions proximate the illumination sensors and respond with the illumination information. Alternatively, the illumination sensors may be configured to unilaterally provide the illumination information, such as in accordance with a predefined schedule.

The illumination sensors 22 may be stand-alone devices that are configured to detect the current lighting conditions proximate the illumination sensors and to provide illumination information regarding those lighting conditions. In addition to or as an alternative to the stand-alone illumination sensors, one or more mobile terminals may also include an illumination sensor for detecting the lighting conditions proximate the mobile terminal and for providing illumination information regarding the lighting conditions to the illumination server along with position information that defines the location of the mobile terminal at the time that the lighting conditions were detected. In the embodiment FIG. 2, for example, each of the image sensors 12 may be embodied as a mobile terminal that also includes an illumination sensor. Since the illumination sensor of a mobile terminal is co-located with the image sensor, the illumination information provided by the mobile terminals may be of significance to the illumination server 18 since the illumination information will be representative of the current lighting conditions at the same location from which the image of the area 10 of interest will be captured.

As shown in FIG. 2, a plurality of mobile terminals may include an illumination sensor 22 and an image sensor 12 and communicate with the illumination server 18 in accordance with an example embodiment of the present invention. In a similar manner to that described above in conjunction with the illumination server, the apparatus 28 of FIG. 3 may be embodied as or otherwise employed, for example, on or as an element of a mobile terminal with the processor 30 and the memory 36 configured to perform the functionality described herein in conjunction with the mobile terminal. However, another example of a mobile terminal 40 is depicted in FIG. 4 and described below. It should be understood, however, that the mobile terminal as illustrated and hereinafter described is merely illustrative of one type of device that may benefit from embodiments of the present invention and, therefore, should not be taken to limit the scope of embodiments of the present invention. As such, numerous types of mobile terminals, such as portable digital assistants (PDAs), mobile telephones, pagers, mobile televisions, gaming devices, laptop computers, cameras, video recorders, audio/video player, radio, positioning devices (e.g., global positioning system (GPS) devices, or any combination of the aforementioned, and other types of voice and text communications systems, may readily employ embodiments of the present invention.

The mobile terminal 40 may include an antenna 42 (or multiple antennas) in operable communication with a transmitter 44 and a receiver 46. The mobile terminal may further include an apparatus, such as a processor 50 or other processing device, which provides signals to and receives signals from the transmitter and receiver, respectively. The signals include signaling information in accordance with the air interface standard of the applicable cellular system, and also user speech, received data and/or user generated data. In this regard, the mobile terminal is capable of operating with one or more air interface standards, communication protocols, modulation types, and access types. By way of illustration, the mobile terminal is capable of operating in accordance with any of a number of first, second, third and/or fourth-generation communication protocols or the like. For example, the mobile terminal may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN, with fourth-generation (4G) wireless communication protocols or the like. As an alternative (or additionally), the mobile terminal may be capable of operating in accordance with non-cellular communication mechanisms. For example, the mobile terminal may be capable of communication in a wireless local area network (WLAN) or other communication networks.

In yet another embodiment, mobile terminal 40 may include an analog radio receiver, such as an AM/FM radio or the like, for receiving the signaling information and the predefined transmitting protocol. In such embodiments, the processor 50 may include circuitry desirable for implementing audio and logic functions of the mobile terminal. For example, the processor 20 may be comprised of a digital signal processor device, a microprocessor device, and various analog to digital converters, digital to analog converters, and other support circuits. Control and signal processing functions of the mobile terminal are allocated between these devices according to their respective capabilities. The processor thus may also include the functionality to convolutionally encode and interleave message and data prior to modulation and transmission. The processor may additionally include an internal voice coder, and may include an internal data modem. Further, the processor may include functionality to operate one or more software programs, which may be stored in memory. For example, the processor may be capable of operating a connectivity program, such as a conventional Web browser. The connectivity program may then allow the mobile terminal to transmit and receive Web content, such as location-based content and/or other web page content, according to a Wireless Application Protocol (WAP), Hypertext Transfer Protocol (HTTP) and/or the like, for example.

The mobile terminal 40 may also comprise a user interface including an output device such as a conventional earphone or speaker 54, a ringer 52, a microphone 56, a display 58, and a user input interface, all of which are coupled to the processor 50. The user input interface, which allows the mobile terminal to receive data, may include any of a number of devices allowing the mobile terminal to receive data, such as a keypad 60, a touch display (not shown) or other input device. In embodiments including the keypad, the keypad may include the conventional numeric (0-9) and related keys (#, *), and other hard and soft keys used for operating the mobile terminal. Alternatively, the keypad may include a conventional QWERTY keypad arrangement. The keypad may also include various soft keys with associated functions. In addition, or alternatively, the mobile terminal may include an interface device such as a joystick or other user input interface. The mobile terminal further includes a battery 64, such as a vibrating battery pack, for powering various circuits that are required to operate the mobile terminal, as well as optionally providing mechanical vibration as a detectable output.

The mobile terminal 40 may further include a user identity module (UIM) 68. The UIM is typically a memory device having a processor built in. The UIM may include, for example, a subscriber identity module (SIM), a universal integrated circuit card (UICC), a universal subscriber identity module (USIM), a removable user identity module (R-UIM), etc. The UIM typically stores information elements related to a mobile subscriber. In addition to the UIM, the mobile terminal may be equipped with memory. For example, the mobile terminal may include volatile memory 70, such as volatile Random Access Memory (RAM) including a cache area for the temporary storage of data. The mobile terminal may also include other non-volatile memory 72, which may be embedded and/or may be removable. The memories may store any of a number of pieces of information, and data, used by the mobile terminal to implement the functions of the mobile terminal. For example, the memories may include an identifier, such as an international mobile equipment identification (IMEI) code, capable of uniquely identifying the mobile terminal. Furthermore, the memories may store instructions for determining cell id information. Specifically, the memories may store an application program for execution by the processor 40, which determines an identity of the current cell, e.g., cell id identity or cell id information, with which the mobile terminal is in communication.

In yet another embodiment, the mobile terminal 40 may include memory, such as long-term memory, that is configured to operate with a file system and is able to achieve an accurate timing synchronization with event time. In this embodiment, the mobile terminal may retrieve signaling information and camera settings from a file with respect to the output of a pre-built internal clock. Synchronization of the camera settings information in the file with the lighting changes occurring in the event may be achieved by measuring the offset of the pre-built internal clock with the event time.

The mobile terminal 40 may also include an illumination sensor 22, such as a light meter. As described above, a light meter is configured gather data representative of the ambient lighting conditions in proximity to the illumination sensor, such as by measuring the amount of light proximate to the light meter.

The mobile terminal 40 may include an image sensor 12, such as a camera, video and/or audio module, in communication with the processor 40. The image sensor may comprise any means for capturing an image, video and/or audio for storage, display or transmission. For example, in an example embodiment in which the image sensor comprises camera circuitry, the camera circuitry may include a digital camera configured to form a digital image file from a captured image. In addition, the digital camera of the camera circuitry may be configured to capture a video clip. As such, the camera circuitry may include all hardware, such as a lens or other optical component(s), and software necessary for creating a digital image file from a captured image as well as a digital video file from a captured video clip. Alternatively, the camera circuitry may include only the hardware needed to view an image, while a memory device of the mobile terminal stores instructions for execution by the processor in the form of software necessary to create a digital image file from a captured image. As yet another alternative, an object or objects within a field of view of the camera circuitry may be displayed on the display 60 of the mobile terminal to illustrate a view of an image currently displayed which may be captured if desired by the user. As such, as referred to hereinafter, an image may be either a captured image or an image comprising the object or objects currently displayed by a display or viewfinder of the mobile terminal, but not necessarily captured in an image file. In an example embodiment, the camera circuitry may further include a processing element such as a co-processor configured to assist the processor in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

Referring again to FIG. 2 and based upon the illumination information, such as provided by one or more illumination sensors 22 and/or a lighting control system 20, the illumination server 18 may determine which one(s) of a plurality of illumination sources 16 is to be illuminated, as well as the time, duration and intensity of the illumination. The illumination server may be configured to determine the manner in which the area 10 of interest is to be illuminated in various manners. As the illumination sources may be positioned at different locations about the area of interest, the illumination server may be configured to determine the illumination sources to be actuated based upon information, provided in one embodiment by the lighting control system, identifying which region(s) of the area of interest is to be illuminated. The illumination server may also be configured to determine the time and duration of the illumination based on various factors, such as timing information provided by the lighting control system and/or information regarding the length of time that a scene is to be illuminated to permit the image sensors to capture a quality image. The illumination server may also be configured to determine the intensity of the illumination which may, at least in part, be based upon the illumination information provided by one or more illumination sensors. In this regard, the illumination information provided by one or more illumination sensors may define the current or ambient lighting conditions proximate the respective sensors. Based upon the current lighting condition and the desired lighting conditions following illumination, such is defined by a lighting control system or based upon the desired lighting requirements for the image sensors that will capture an image of the area of interest, the illumination server may determine the intensity with which the illumination sources are to illuminate the area of interest.

As shown in FIG. 2, the illumination system 14 also includes a plurality of illumination sources 22. While the illumination server 18 may communicate directly with the plurality of illumination sources, the illumination system of one embodiment also includes an interface switch 26 that receives instructions from the illumination server as to which illumination sources to be actuated and the time, duration and intensity of the resulting illumination. The interface switch may therefore communicate with the appropriate illumination sources to direct the illumination sources to provide the desired illumination.

As mentioned above, the illumination sources 22 may be positioned as various locations about the area 10 of interest. Additionally, the illumination sources of one embodiment may be of various types, such as IR lamps and visible wavelength lamps. In an embodiment in which the plurality of illumination sources include both infra-red lamps and visible wavelength lamps, the illumination server 18 may also be configured to determine the appropriate combination of types of illumination sources, such as the appropriate combination of IR lamps and visible wavelength lamps, to be actuated in order to appropriately illuminate the area of interest. In some settings, for example, the illumination server may actuate only IR lamps in order to illuminate the area of interest without disturbing the scene, such as in an instance in which the scene is to be relatively dark so as to create the desired mood. Alternatively, in other settings, the illumination server may be configured to actuate only visible wavelength lamps or a combination of visible wavelength lamps and IR lamps. The illumination server may determine the appropriate combination of illumination sources to be actuated in various manners including based upon information provided by the lighting control system 20 that may define the intensity of visible light with which the area of interest is be illuminated and input from the illumination sensors which may provide an indication as to whether or not the area of interest currently is illuminated with sufficient visible light.

Once the area 10 of interest has been illuminated, one or more images may be captured, such as by the image sensors 12. In order to facilitate the capture of appropriate images while the area of interest is illuminated, the illumination server 18 may also be configured to determine one or more parameters related to at least one recommended image capture setting for at least one image sensor. The illumination server may determine the one or more parameters based upon the illumination information provided by the illumination sensor(s) and/or the illumination that is to be provided by the illumination source(s) 16. The illumination server may determine various parameters related to at least one recommended image capture setting including the time, duration and intensity of the illumination to be provided by the illumination source(s) and/or the exposure time, focal length or analog gain that would be advantageous for an image sensor to employ given the illumination that is to be provided. The illumination server of this embodiment may therefore cause the one or more parameters related to at least one recommended image capture setting to be provided to the image sensor(s). The illumination server may communicate with the image sensors via any of a wide variety of transport mechanisms including, for example, interne protocol (IP) transport mechanisms such as hypertext transfer protocol (HTTP)/extensible markup language (XML) or session initiation protocol (SIP)/session description protocol (SDP) or non-IP transport mechanisms such as those that utilize the link layer of the access network, such as the link layer of a wireless local area network (WLAN).

In another embodiment, the illumination server 18 may use analog radio transmission (AM/FM) in order to communicate with the image sensors 12, e.g., mobile terminals, since many of the current mobile terminals can be equipped with analog of radio receivers (AM/FM). The use of analog radio based communication makes an additional type of signaling available which can work in auditoriums that do not get a sufficient digital radio signal. Also, the analog radio based signaling of information is useful since many entry level mobile terminals are equipped with analog radio receivers, but not WLAN connectivity, (with the analog radio based signaling of information likely to be easier to use compared to traditional cellular networks due to various reasons such as better performance, cost, etc). The information provided via the radio interface, such as via an AM/FM receiver, may include illumination information, a time-related illumination condition proximate a respective image sensor (that is, in turn, provided to the illumination system) and at least one time-related parameter related to at least one recommended image capture setting.

In yet another embodiment, signaling information may be reconstructed by the image sensors 12, e.g., mobile terminals, from some information entity, such as an Events File, which was delivered or downloaded to the image sensor in advance, such as in conjunction with professional events where a lighting control system is expected to be in use and the event has a well rehearsed routine that is to be performed. This preprogrammed signaling information may be leveraged in some embodiments to generate an EVENT-FILE that is provided to the image sensors in a digital format in a suitable manner (e.g., as an SMS after buying an online ticket, as a digital file transfer from kiosks in the event venue or any other suitable method). This file can subsequently be used by the software client of an image sensor, such as a users' mobile terminal, that reads the time-stamped information about image capture settings, remote flash time, duration, etc. to configure the imaging chain in the imaging sensor. The synch-point may be required to be established only once between the EVENT-FILE and the local event clock using any suitable method. In one embodiment, the information provided by the event file may include illumination information, a time-related illumination condition proximate a respective image sensor (that is, in turn, provided to the illumination system) and at least one time-related parameter related to at least one recommended image capture setting. In an example embodiment, the illumination server 18 may be configured to push the recommended image capture setting(s) to the image sensors so as to minimize the time required for signaling and to facilitate broadcast of the recommended image capture setting(s) to a plurality of image sensors.

The image sensor(s) 12 may receive the parameter and may then capture the image in accordance with the at least one parameter. In this regard, an image sensor may capture an image at a time that is determined based upon the time and duration of the illumination of the area 10 of interest. Still further, the image sensor may capture an image utilizing the exposure time, focal length and/or analog gain recommended by the illumination server 18, thereby increasing the likelihood that the resulting image captured by the image sensor is satisfactory. By providing recommended image capture settings from the illumination server to the image sensors, the image sensors may have a simpler construction in that the image sensors may not need to be able to independently calculate or determine the desired exposure time, focal length or analog gain, but may, instead, respond to the recommended image capture settings provided by the illumination server and capture images accordingly.

By way of another example of the communication between the illumination server 18 and a mobile terminal 40, FIG. 5 illustrates the provision of illumination information signaling, such as information regarding the time at which and a duration during which an illumination source 16 will be illuminated and/or a parameter related to at least one recommended image capture setting, such as information regarding the exposure time, analog gain or focal length, from the illumination server to an illumination information receiver 80, such as the receiver 46 and/or processor 40, of the mobile terminal. As shown in FIG. 5, the illumination information receiver may provide the illumination information to the imaging chain configuration 82 and, in turn, to the visible spectrum imaging chain 84 and/or the IR imaging chain 86, as appropriate and as provided in one embodiment by the processor and/or the image sensor 12.

Referring now to FIG. 6, the operations performed from the perspective of the illumination server 18 are illustrated. In this regard, the operations of FIG. 6 may be performed by an apparatus 28 that comprises or is embodied in the illumination server. As shown in block 100, the apparatus may include means, such as a communication interface 34, a processor 30 or the like, for receiving illumination information from at least one of an illumination sensor 22 or lighting control system 20. In this regard, the illumination information received from the illumination sensor is representative of an illumination condition in at least one region of an area 10 of interest. The apparatus of this embodiment also includes means, such as the processor or the like, for determining at least one of a plurality of illumination sources to be illuminated based upon the illumination information and for also determining the time at which the at least one illumination source will be illuminated. See block 110. In an embodiment in which the plurality of illumination sources include IR lamps and visible wavelength lamps, the apparatus may also include means, such as the processor or the like, for determining whether a combination of IR and visible-light lamps is to be illuminated based upon the illumination information.

As shown in block 120, the apparatus 28 of this embodiment also includes means, such as the processor 30 or the like, for determining a parameter related to at least one recommended image capture setting for at least one image sensor 12 based upon at least one of the illumination information or illumination to be provided by the at least one other illumination source 16. In this regard, the parameter that is determined may be the time, duration and intensity of the illumination to be provided by at least one illumination source, the exposure time, the focal length and/or the analog gain that is recommended for the image sensor. As shown in block 130, the apparatus may include means, such as the processor, the communication interface 34, or the like, for causing the parameter related to the at least one recommended image capture setting to be provided to the at least one image sensor. As noted above, the parameter that is caused to be provided to the at least one image sensor may be the time, duration and intensity of the illumination to be provided by the at least one illumination source, the exposure time, the focal length and/or the analog gain or any other parameters that may be utilized by the illumination sensor in capturing an image of the area 10 of interest. Additionally, the apparatus may include means, such as the processor, the communication interface or the like, for causing a message to be issued to the at least one illumination source to cause the at least one illumination source to be actuated at the time that has been determined. See block 140. In one embodiment in which the illumination system 14 includes an interface switch 26, the message may be caused to be issued to the interface switch that is, in turn, in communication with the plurality of illumination sources.

Referring now to FIG. 7, a flowchart illustrating the operations performed by an apparatus including or otherwise in communication with an image sensor 12, such as a mobile terminal 40 as illustrated in FIG. 4. In this regard, the apparatus may be embodied as shown in FIG. 3 and/or may comprise at least a portion of the mobile terminal of FIG. 4. As shown in block 200 and with reference to the embodiment of FIG. 4, the apparatus may include means, such as a light meter 22 or the like, for detecting the illumination conditions proximate the apparatus, such as by detecting the ambient light conditions proximate the apparatus. The apparatus may also include means, such as the processor 40, the transmitter 44, the antenna 42 or the like, for causing illumination information representative of the illumination conditions proximate to the apparatus to be provided to an illumination system 14, such as the illumination server 18. See block 210. As shown in block 220, the apparatus may include means, such as the processor, the receiver 46, the antenna or the like, for receiving at least one parameter related to at least one recommended image capture setting, such as from the illumination server. The recommended image capture setting may be the time, duration and intensity of the illumination to be provided by the illumination system, the exposure time, the focal length and/or the analog gain recommended for the image sensor 12, to name just a few of the possible parameters. As shown in block 230, the apparatus may also include means, such as the processor, the image sensor or the like, for causing an image to be captured in accordance with the at least one parameter.

FIGS. 6 and 7 are flowcharts of a method and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of the mobile terminal or network device and executed by a processor in the mobile terminal or network device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowcharts block(s). These computer program instructions may also be stored in a computer-readable memory that may direct a computer or other programmable apparatus to function in a particular manner, such that the instructions stored in the computer-readable memory produce an article of manufacture including instruction means which implement the function specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts block(s).

Accordingly, blocks of the flowcharts support combinations of means for performing the specified functions, combinations of operations for performing the specified functions and program instruction for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving illumination information from at least one of an illumination sensor or a lighting control system, wherein the illumination information received from the illumination sensor is representative of an illumination condition in at least one region of an area of interest;
   determining at least one of a plurality of illumination sources is to be illuminated based upon the illumination information from the illumination sensor or from the lighting control system and also determining a time at which the at least one illumination source will be illuminated;
   determining a parameter related to at least one recommended image capture setting for at least one image sensor based upon at least one of the illumination information from the illumination sensor or from the lighting control system or illumination to be provided by the at least one illumination source, wherein the at least one recommended image capture setting comprises a time, duration, and intensity of the illumination to be provided by the at least one illumination source;
   causing the parameter related to the at least one recommended image capture setting to be provided to the at least one image sensor, wherein the parameter comprises a time and a duration during which the at least one illumination source will be illuminated; and
   causing a message to be issued to the at least one illumination source to cause the at least one illumination source to be actuated at the time that has been determined.

2. A method according to claim 1, wherein the plurality of illumination sources comprises at least one infra red lamp and at least one visible-light lamp, and wherein determining at least one of the plurality of illumination sources to be illuminated comprises determining whether a combination of infra red and visible-light lamps to be illuminated is based upon the illumination information.

3. A method according to claim 1, wherein determining the parameter related to at least one recommended image capture setting comprises determining exposure time, analog gain or focal length.

4. A method according to claim 3, further comprising causing information regarding the exposure time, analog gain or focal length to be provided to the at least one image sensor.

5. A method according to claim 1, wherein causing a message to be issued to the at least one illumination source comprises causing a message to be issued to an interface switch that is in communication with the plurality of illumination sources.

6. An apparatus comprising at least one processor and at least one memory including computer program code, the at least one memory and the computer program code configured to, with the at least one processor, cause the apparatus at least to:
   receive illumination information from at least one of an illumination sensor or a lighting control system, wherein the illumination information received from the illumination sensor is representative of an illumination condition in at least one region of an area of interest;
   determine at least one of a plurality of illumination sources is to be illuminated based upon the illumination information from the illumination sensor or from the lighting control system and also determine a time at which the at least one illumination source will be illuminated;
   determine a parameter related to at least one recommended image capture setting for at least one image sensor based upon at least one of the illumination information from the illumination sensor or from the lighting control system or illumination to be provided by the at least one illumination source, wherein the at least one recommended image capture setting comprises a time, duration, and intensity of the illumination to be provided by the at least one illumination source;
   cause the parameter related to the at least one recommended image capture setting to be provided to the at least one image sensor, wherein the parameter comprises a time and a duration during which the at least one illumination source will be illuminated; and
   cause a message to be issued to the at least one illumination source to cause the at least one illumination source to be actuated at the time that has been determined.

7. An apparatus according to claim 6, wherein the plurality of illumination sources comprises at least one infra red lamp and at least one visible-light lamp, and wherein the at least one memory and the computer program code are configured to, with the at least one processor, cause the apparatus to determine at least one of the plurality of illumination sources to be illuminated by determining whether a combination of infra red and visible-light lamps to be illuminated is based upon the illumination information.

8. An apparatus according to claim 6, wherein the at least one memory and the computer program code are configured to, with the at least one processor, cause the apparatus to determine the parameter related to at least one recommended image capture setting by determining exposure time, analog gain or focal length.

9. An apparatus according to claim 8, wherein the at least one memory and the computer program code are further configured to, with the at least one processor, cause the apparatus to cause information regarding the exposure time, analog gain or focal length to be provided to the at least one image sensor.

10. An apparatus according to claim 6, wherein the at least one memory and the computer program code are configured to, with the at least one processor, cause the apparatus to cause a message to be issued to the at least one illumination source by causing a message to be issued to an interface switch that is in communication with the plurality of illumination sources.

11. An apparatus according to claim 6 wherein the apparatus comprises or is embodied in a server.

12. A computer program product comprising at least one non-transitory computer-readable storage medium having computer-executable program code instructions stored therein, the computer-executable program code instructions comprising program code instructions to:

receive illumination information from at least one of an illumination sensor or a lighting control system, wherein the illumination information received from the illumination sensor is representative of an illumination condition in at least one region of an area of interest;

determine at least one of a plurality of illumination sources is to be illuminated based upon the illumination information from the illumination sensor or from the lighting control system and also determine a time at which the at least one illumination source will be illuminated;

determine a parameter related to at least one recommended image capture setting for at least one image sensor based upon at least one of the illumination information from the illumination sensor or from the lighting control system or illumination to be provided by the at least one illumination source, wherein the at least one recommended image capture setting comprises a time, duration, and intensity of the illumination to be provided by the at least one illumination source;

cause the parameter related to the at least one recommended image capture setting to be provided to the at least one image sensor, wherein the parameter comprises a time and a duration during which the at least one illumination source will be illuminated; and cause a message to be issued to the at least one illumination source to cause the at least one illumination source to be actuated at the time that has been determined.

13. The computer program product according to claim 12, wherein the plurality of illumination sources comprises at least one infra red lamp and at least one visible-light lamp, and wherein the at least one memory and the computer program code are configured to, with the at least one processor, cause the apparatus to determine at least one of the plurality of illumination sources to be illuminated by determining whether a combination of infra red and visible-light lamps to be illuminated is based upon the illumination information.

14. The computer program product according to claim 12, further comprising program code instructions to determine the parameter related to at least one recommended image capture setting by determining exposure time, analog gain or focal length.

15. The computer program product according to claim 14, further comprising program code instructions to cause information regarding the exposure time, analog gain or focal length to be provided to the at least one image sensor.

16. The computer program product according to claim 12, further comprising program code instructions to cause a message to be issued to the at least one illumination source by causing a message to be issued to an interface switch that is in communication with the plurality of illumination sources.

* * * * *

UNITED STATES PATENT AND TRADEMARK OFFICE
CERTIFICATE OF CORRECTION

| | |
|---|---|
| PATENT NO. | : 8,860,843 B2 |
| APPLICATION NO. | : 13/046097 |
| DATED | : October 14, 2014 |
| INVENTOR(S) | : Mate et al. |

Page 1 of 1

It is certified that error appears in the above-identified patent and that said Letters Patent is hereby corrected as shown below:

In the claims:

Column 17,
Line 65, Claim 2, "deter mining" should read --determining--.

Signed and Sealed this
Second Day of June, 2015

Michelle K. Lee
*Director of the United States Patent and Trademark Office*